May 16, 1933.  I. L. PULLIAM  1,908,788
APPARATUS FOR WASHING TOPS OF VEHICLES
Filed May 20, 1929   4 Sheets-Sheet 1

Inventor
Ira L. Pulliam
By Lyon & Lyon
Attorneys

May 16, 1933. I. L. PULLIAM 1,908,788
APPARATUS FOR WASHING TOPS OF VEHICLES
Filed May 20, 1929 4 Sheets-Sheet 3

Inventor
Ira L. Pulliam
By Lyon & Lyon
Attorneys

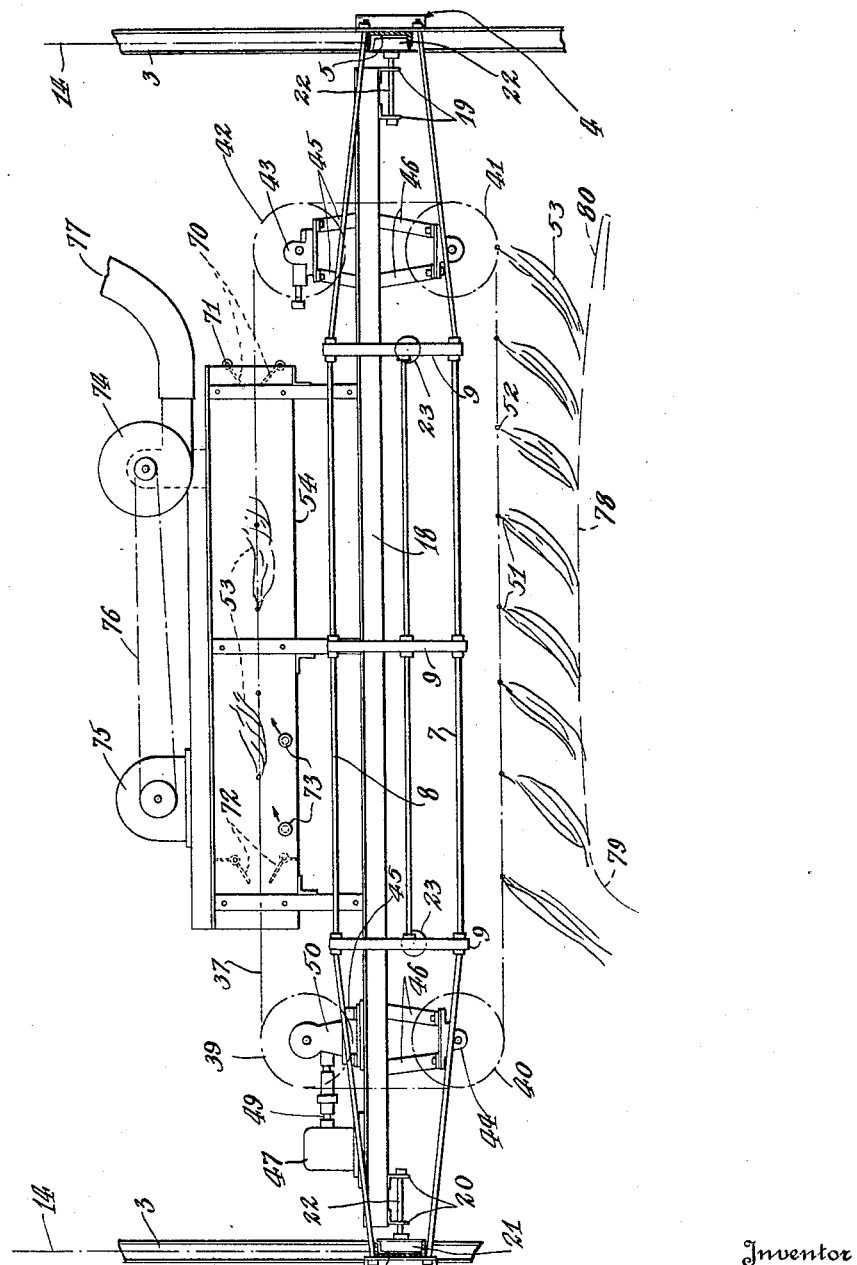

Patented May 16, 1933

1,908,788

UNITED STATES PATENT OFFICE

IRA L. PULLIAM, OF LOS ANGELES, CALIFORNIA, ASSIGNOR TO RICHFIELD OIL COMPANY OF CALIFORNIA, OF LOS ANGELES, CALIFORNIA, A CORPORATION OF DELAWARE

APPARATUS FOR WASHING TOPS OF VEHICLES

Application filed May 20, 1929. Serial No. 364,430.

This invention relates to an apparatus adapted to wash tops of vehicles in a thorough and efficient manner. The device is particularly designed to wash the tops of automobiles thoroughly, and remove therefrom all adhering dirt, grease and other impurities.

The device may also be used in dusting the tops of vehicles and in applying dressings, oils, paints and similar materials thereto.

The apparatus is particularly designed for use in conjunction with vehicle washing systems, or vehicle assembly lines. For purposes of illustration the invention will be described in detail as it may be applied to the washing of the tops of vehicles, such as automobiles.

In washing automobiles and other vehicles, they are generally passed through a predetermined system along predetermined lines. For example, one of the systems for washing vehicles comprises passing said vehicles along a runway provided with pits along one portion of the runway, in which pits operators are positioned to wash the lower portions, wheels, etc. of the vehicles.

A raised platform is often provided along a portion of the runway, operators being positioned on said platform provided with long-handled brushes equipped with water nozzles by means of which said operators wash tops of the vehicles as they are moved past said platform.

My invention relates to a device which may be positioned at a proper point above a runway or conveyor on which vehicles are passed, the device automatically washing or dressing the tops of said vehicles. A plurality of the devices may be thus positioned, one of said devices washing the tops, another mopping or drying the top, and another applying a dressing to the washed and dried top.

An object of this invention is to provide an apparatus capable of automatically washing the tops of vehicles. Another object is to provide a device whereby a cleaning means may be passed over the top of a vehicle with a motion comparable to that obtained during manual cleaning operations.

A still further object of this invention is to provide an apparatus capable of treating tops of vehicles so as to clean, dress and dry such tops, and all crevices or configurations thereof.

Another object is to provide a device provided with a continuous cleaning means which is automatically renovated during use.

As has been stated before, the embodiment of the invention which will hereinafter be described in detail pertains to a device adapted for use in the cleaning and dressing of automobile tops. Details of construction hereinafter described need not be followed precisely, the invention including numerous changes and modifications which will become apparent to those skilled in the art from the detailed description of the preferred embodiment.

In describing the invention, reference will be had to the appended drawings, in which:

Fig. 5 is a side elevation of a modified form of the device.

Figure 1:
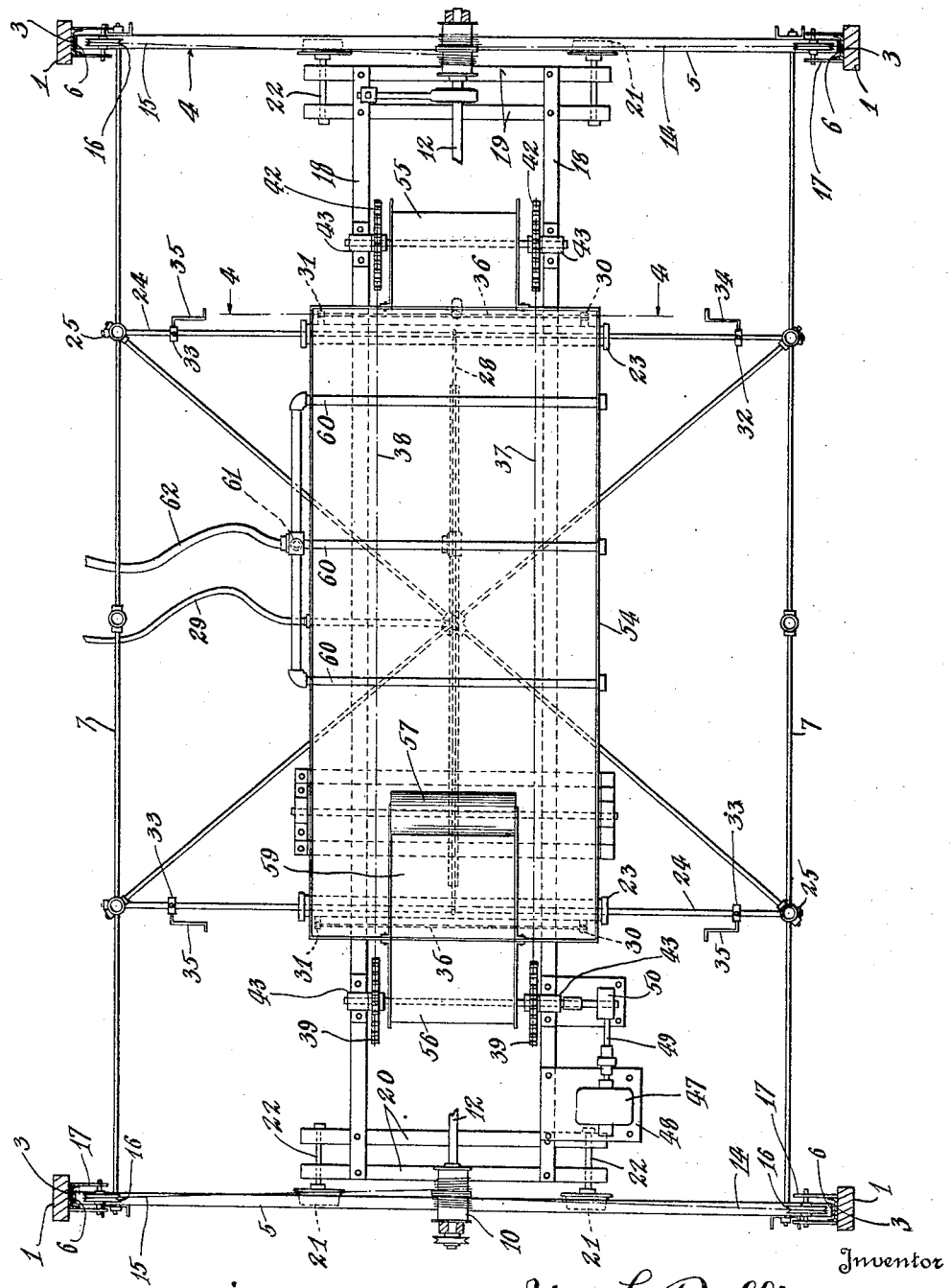
Fig. 1 is a plan view of the device with the top or cover of the renovating chamber removed.

Generally described, the device illustrated in the drawings comprises a movable carriage, the carriage preferably being movable transversely to the vehicle whose top it is desired to clean or dress. Furthermore, the entire carriage is movable vertically so as to permit its adjustment with respect to the vehicle. The carriage is preferably provided with a series of cleaning means, and with means for driving said series of cleaning means. Means for cleaning the cleaning means may be carried by the carriage, said cleaning or renovating means being positioned in one portion of the travel of the cleaning means.

Figure 2:
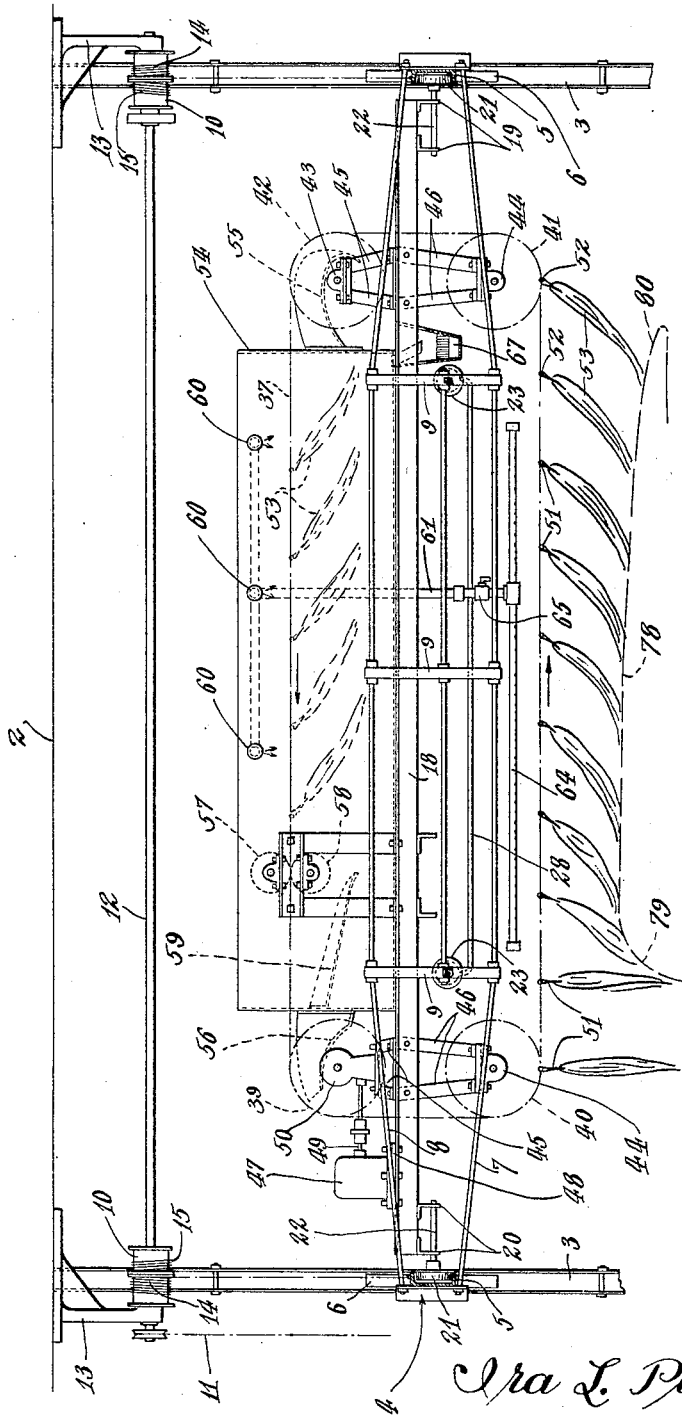
Fig. 2 is a side elevation of the device shown in Fig. 1.
Figure 3:
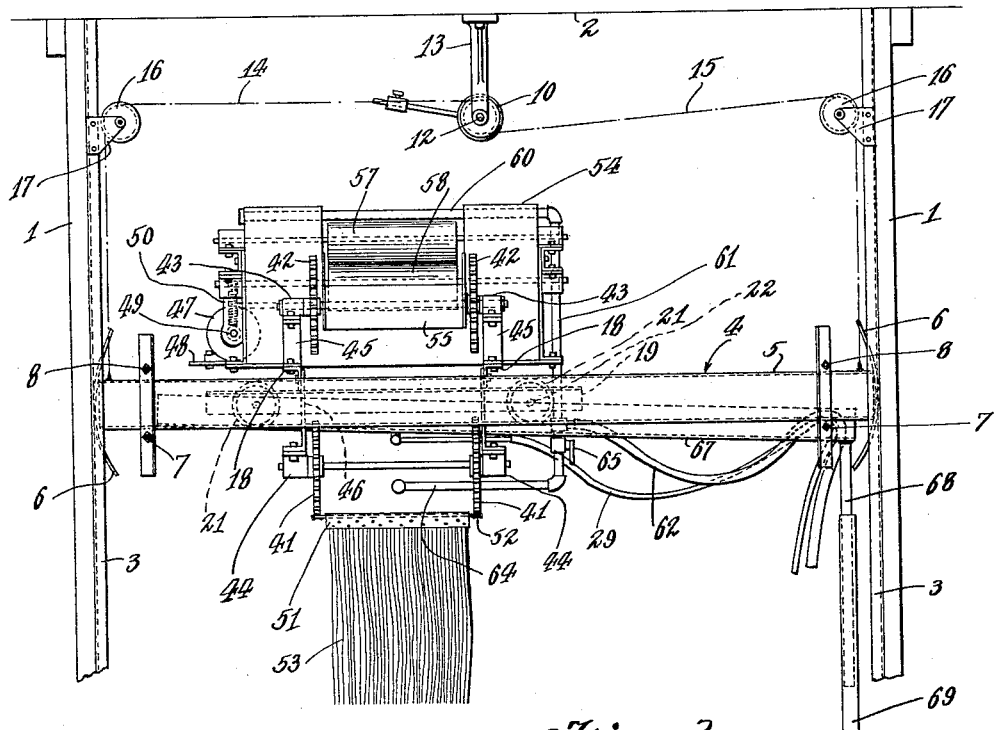
Fig. 3 is an end elevation of the device.

As shown in Figs. 1, 2 and 3, the apparatus may be mounted to move vertically along vertical guides or posts 1, resting on the ground or suspended from a ceiling 2. Channel irons 3 may be fixed to the inner sides of the vertical posts 1, the channel irons 3 acting as guides for a frame 4 vertically movable between the posts 1.

The frame 4 may include channel irons or other suitable bracketed means 5, and the frame 4 may be provided at its ends with anti-friction devices such as the shoes 6, adapted to be slidably received in the vertical channels or guides 3 attached to or made a part of the vertical post 1.

The end members of the frame 4 may be connected together as by suitable truss rods 7 and 8, maintained in spaced relationship by the vertical members 9 and tied together by suitable cross braces. It will be understood that the precise construction may be modified somewhat, in accordance with accepted engineering practice.

The frame 4 may be moved vertically along the vertical guides attached to the corner posts 1, by means of a windlass or hoist 10 which may be operated in any suitable manner. For example, it may be operated by means of a chain 11 extending downwardly from the shaft 12 on which the winding drum is mounted, so as to permit the operation of the winding drum by an operator from the floor on which the vehicles whose tops are to be washed by the device are moving.

The winding drums or winches 10 (one of said drums or winches 10 being positioned over each end of the frame 4) may be mounted upon a common shaft 12 suspended from the ceiling or other suitable support as by means of the hanger 13.

The winding drums 10 may be connected by suitable cables 14 and 15 passing over pulleys 16 journaled on brackets 17 extending from or being a part of the corner posts 1 and attached to the ends of the frame 4. Operation of the winding drums 10 by means of the chain 11, or any other suitable means will, therefore, cause the cables 14 and 15 to be wound upon the winding drums 10 and raise the frame 4 along the guides 3 and corner posts 1. The shoes 6 assist in reducing friction between the frame and the guides and prevents sticking of the frame in the guides.

As is the case with all winches and hoists of the general class described, suitable ratchets or locking means are provided (though not shown on the drawings), for maintaining the winding drums in position and preventing the frame 4 from falling under its own weight until said ratchets or other holding means are released.

A carriage is preferably supported by the frame 4, said carriage being movable in a horizontal plane. Such a carriage may comprise longitudinal members 18, maintained in spaced relation at their ends by suitable end members such as the members 19 and 20. Wheels 21 mounted on shafts 22 journaled in the members 19 and 20 may rest upon the guide rails formed by the channel irons, or other brackets 5 attached to or made a part of the end members of the frame 4.

Motion of the carriage along the guides 5 of the frame 4 may be automatically and reciprocably produced in a number of ways, but more particularly, means for moving the carriage along the frame 4 reciprocably and automatically may comprise one or more cylinders 23 carried by the longitudinal members 18 of the carriage, the cylinders 23 having their axes in alinement with the direction of movement of the carriage, for example, having their axes parallel to the guides 5 of the frame 4. Piston rods 24 firmly attached to the frame as at 25, for example, may pass through the cylinders 23, the piston rods 24 having a piston mounted thereon and operably received in the cylinders 23.

The piston or pistons 23, together with the carriage connected thereto may be caused to move back and forth along the piston rods 24 by means of any suitable fluid under pressure, for example, compressed air. When air is used, suitable three-way valves 26 and 27 are operably connected to the cylinder 23 at opposite ends thereof. Valves 26 and 27 are connected together by means of suitable piping 28 and to a source of fluid under pressure, for example, the line 29 leading to a source of fluid under pressure, not shown. The valves 26 and 27 may be provided with operating handles 30 and 31 respectively.

Stops 32 and 33 are preferably connected to the piston rods 24 at suitable points near the end of the travel of the carriage, the stops 32 and 33 being provided with projecting stop arms 34 and 35, respectively, adapted to contact with and operate the valve handles 30 and 31, respectively.

Figure 4:
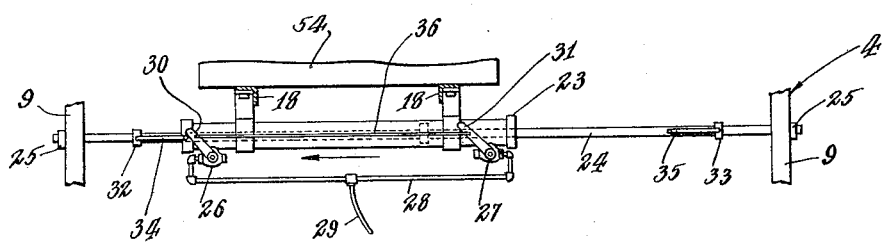
Fig. 4 is a vertical section of a portion of the device, the section being taken along line 4—4 of Fig. 1.

As shown in Fig. 4, the arrangement of elements is such that when the cylinder 23 and carriage attached thereto is moving in the direction of the arrow, fluid under pressure is being supplied from the line 29 into line 28 and into valve 26, which is open, and permits the entry of the compressed fluid into the cylinder 23 at that end. Simultaneously, valve 27 is in such position that pressure fluid from line 28 cannot enter cylinder 23 but the interior of the cylinder 23 at that end communicates with the atmosphere through an open port in said valve, or communicates with a suitable discharge line (when water is the compressed fluid used). As the cylinder 23 continues to move in the direction of the arrow, shown in Fig. 4, stop arm 34 contacts with the handle 30 of valve 26, causing said handle 30 to move in a clockwise direction. The handles 30 and 31 are connected together by means of a link 36 so that the clockwise movement of the handle 30 is transmitted to and results in a similar clockwise movement of handle 31.

Such clockwise movement of handle 30 closes the valve 26, preventing increase of compressed fluid into the cylinder 23 through said valve, and opening a port communicating from the interior of the cylinder 23 with the atmosphere or a suitable discharge line. Simultaneously, the valve 27 is opened by the clockwise motion of the handle 31 so as to admit compressed fluid from line 28, through said valve into the interior of the cylinder 23. This operation causes the cylinder 23 to travel in the opposite direction, namely, to the right, towards stop arm 35, where a similar but opposite action takes place. In this manner the cylinder 23 and the carriage are automatically caused to reciprocably travel along the piston rods 24 carried by the frame.

The carriage 18 is preferably provided with a belt-like series of cleaning means which may comprise spaced endless chains 37 and 38, which may pass over suitable sprockets 39, 40, 41 and 42 mounted on horizontal shafts journaled in suitable bearings such as 43 and 44, the bearings 43 being supported on legs 45 above the main longitudinal frames 18 of the carriage, whereas the bearings 44 are dependent from the main longitudinal frames 18 by hangers 46. In this manner the chains 37 and 38 are permitted to pass both above and below the carriage and between the longitudinal carriage members 18.

Means for driving the sprockets 39, 40, 41 and 42 may be carried by the carriage. For example, such means may include a motor 47 mounted upon a suitable bracket extension 48 attached to or made a part of the carriage, the motor shaft 49 driving the shaft on which sprockets 39 are mounted, through the medium of a suitable gear box 50.

The cleaning means carried by the chains 37 and 38 may comprise a plurality of elements 51 in spaced relation to each other, connecting the endless chains 37 and 38 and pivotally supported in said chains, as indicated at 52. Mops or cloths 53 may be attached to the elements 51 in any suitable manner, said mops or cloths being of any desired length.

On the carriage, means for cleaning the cleaning means, including the mops 53, may be provided. Such cleaning or renovating means may include a receptacle 54 attached to or resting upon the longitudinal members 18 of the carriage, and between the upper sprocket wheels 39 and 42 carrying the cleaning means.

The container 54 is preferably provided with inlet and outlet openings, guides 55 being provided at the inlet end and extending outwardly so as to cover the shaft on which sprocket 42 are mounted, so as to prevent the mops 53, while they are being carried over sprockets 42, from becoming entangled in or wrapping themselves around said shaft.

A similar guide 56 may be provided at the outlet end also covering the shaft on which sprockets 39 are mounted. Wringer rollers 57 and 58 in operative relation to each other may be rotatably journaled within the container 54, near the outlet therefrom. A drainboard 59 may be positioned within the container 54 above the bottom thereof, and between the wringers 57 and 58 and the outlet, so as to prevent the wringed cleaning mops 53 from contacting with the lower portion of the container 54 which may contain a liquid such as water.

During the passage of the cleaning means through that portion of the container adjoining the inlet end, the mops may be sprayed with a suitable cleaning fluid from one or more spray lines 60, supplied with water or other cleaning fluid from a line 61, which in turn may be supplied with the cleaning fluid through a flexible hose connection 62, as shown in Figs. 1 and 3.

A spray line or lines 64 may also be positioned beneath the carriage 18, but above the cleaning means, when they are in the lower portion of their travel, said spray line 64 also being supplied with fluid from the line 62. A suitable valve 65 may be positioned in the line 61 so as to permit the regulation of the quantity of cleaning fluid or water supplied to the spray line 64.

Liquid from the tank or container 54 may be discharged through a spout opening 66 in the bottom thereof, the spout opening 66 (shown in detail in Fig. 2) discharging into an inclined trough 67 carried by the frame 4 on which the carriage reciprocates. The trough 67 may be provided with a downwardly extending outlet pipe 68 adapted to telescope into a standing vertical discharge pipe 69. In this manner the vertical adjustment of the frame 4 does not break the continuity of discharge means from the container 54 on the carriage.

In the modified form of apparatus, shown in Fig. 5, the receptacle 54 is shown provided with yielding inlet valves or doors 70, pivoted as at 71 so as to admit the continuous cleaning means including the mops or cloths 53, and close after such mops have been admitted into the receptacle 54.

The doors or valves 70 may be made of an elastic material such as rubber, or they may be rubber-edged metallic doors provided with spring hinges at 71 so as to normally maintain said doors in a closed position.

The container 54, in this modification, may be substantially air-tight and include one or more lines 73 through which compressed air is ejected forcibly against the cleaning means within the container 54, so as to blow off dust adhering to the cleaning means. A suitable suction fan 74 may be operably connected to the container 54, the fan 74 being driven in any suitable manner, as for example, by means of a motor 75 and a belt 76. The outlet of the suction fan 74 (whose inlet communicates with the interior of the container 54) may discharge to the atmosphere as indicated at 77.

The operation of the apparatus described hereinabove will be readily understood. The entire device is positioned over a runway or at any other suitable point over which vehicles are driven, towed, rolled or carried. The frame 4 is moved vertically so that the cleaning means, including the swabs or mops 53, will contact during their lower portion of travel between the sprockets 40 and 41, with the tops of the vehicles or with the tops of the majority of vehicles such as the top indicated at 78. The motor 47 drives the sprockets 39, thereby causing the belt-like cleaning means to move in the direction of the arrow, indicated on Fig. 2. Concurrently with this continuous movement of the cleaning means, the carriage 18 carried by the frame reciprocates transversely to the continuous movement of the cleaning means by the operation of suitable means, such as the pneumatic means, including the cylinders 23 and piston rods 24.

While the cleaning means pass over the top of the vehicle 78, they are sprayed with a suitable cleaning fluid such as water, discharged from the spray pipe 64. The vehicle tops are, therefore, not cleaned by merely a longitudinal movement of the cleaning means, but instead the movement of the cleaning means is a combination of a longitudinal movement and a transverse movement. In this manner it is possible to employ a relatively narrow cleaning means, and to compensate for such narrowness by the reciprocable movement of the cleaning means across or transversely of the vehicle top.

By making the swabs or mops fairly long, any irregularities or depressions in the vehicle top are reached. For example, the rear rounded corners 79 and the forward inclined portion 80 are cleaned just as effectively as the intermediate substantially level portion 78. The cleaning means after contacting and washing the vehicle top, then passes upwardly between sprockets 41 and 42 and then enters the renovating or cleaning chamber 54, in which the mops or swabs 53 are washed with water sprayed thereon through the spray lines 60. A certain quantity of liquid may be maintained in the container 54 by having the outlet 66 discharge from a point partly up the sides of the container 54.

The washed mops 53 then pass through the wringer rollers 57 and 58, the swabs then falling upon the drainboard 59 so as to prevent them from contacting with the water in the bottom of the container 54, and are then carried over sprocket 39 downwardly toward sprocket 40 in condition for further top washing operations.

If it is desired to merely dust the tops of vehicles, the modified form of apparatus shown in Fig. 5 may be employed. There, substantially dry mops 53 may be employed, or such mops may be partly saturated with an oil or dressing. Any dust adhering to the mops 53 will be removed therefrom during the passage of the belt-like cleaning means through the container 54 in which the mops are subjected to a forcible current of air blown thereagainst, and the dust so removed discharged by means of the fan 74. Dusting machines embodying the invention herein described my be positioned in canopies of service stations so as to automatically dust the tops of all vehicles stopping at such service stations for oil or fuel.

It is to be understood that the invention described hereinabove is not limited to the exact details of construction depicted in the drawings. Numerous changes and modifications may be made without departing from the invention, all such changes and modifications as come within the scope of the appended claims being embraced thereby.

I claim:

1. An apparatus for washing the tops of vehicles comprising a frame movable into a position adjacent to and roughly parallel with a vehicle top to be washed, a carriage mounted for reciprocable movement in said frame, said carriage being reciprocably movable in a substantially horizontal path, means for continuously reciprocating said carriage in said frame, cleaning means supported by said carriage and movable with respect thereto in a horizontal path transverse to the path of movement of the carriage, and means for continuously moving said cleaning means with respect to said carriage whereby it moves in a zigzag path with respect to a vehicle top therebelow.

2. An apparatus for washing vehicles comprising vertical guides, a frame adapted to be moved vertically along said guides, means for moving and positioning said frame, a carriage reciprocably movably mounted in said frame, a horizontal path, means for continuously reciprocating said carriage in said frame in a horizontal path, cleaning means supported by said carriage and movable with respect thereto in a path transverse to the path of movement of the carriage, and means for continuously moving said cleaning means with respect to said carriage, whereby it moves in a zigzag path with respect to the surface to be cleaned.

3. An apparatus for washing the tops of vehicles comprising a frame movable vertically, a plurality of substantially horizontal positions, a carriage reciprocably movably mounted in said frame for horizontal movement in one direction, means for continuously reciprocating said carriage in said frame, said last named means including a stationary piston rod attached to said frame, a piston carried by said rod, a cylinder adapted to operatively receive said piston carried by said piston, means for supplying fluid under pressure to opposite ends of said cylinder, valve means for alternately admitting fluid under pressure to opposed ends of said cylinder at the end of reciprocable movement of said carriage, cleaning means supported by said carriage and movable with respect thereto in a path transverse to the path of movement of the carriage, and means for continuously moving said cleaning means with respect to said carriage whereby it moves in a zigzag path with respect to the top of the vehicle therebelow.

4. An apparatus for washing the tops of vehicles comprising a frame movable vertically into a plurality of substantially horizontal positions, a carriage reciprocably mounted in said frame, means for continuously reciprocating said carriage in said frame, an endless carrier provided with cleaning means, means mounted on said carriage for continuously moving successive portions of said carrier through a substantially horizontal path at an angle to the path of movement of said carriage whereby a substantial portion of said cleaning means moves simultaneously in a zigzag path with respect to a vehicle top positioned therebelow.

Signed at Los Angeles, Calif., this 22nd day of April 1929.

IRA L. PULLIAM.